(12) United States Patent
Nordlin

(10) Patent No.: US 10,835,944 B2
(45) Date of Patent: Nov. 17, 2020

(54) CUTTING ASSEMBLY INCLUDING CLAMPING ASSEMBLY

(71) Applicant: GREENLEE TEXTRON INC., Rockford, IL (US)

(72) Inventor: William Frederick Nordlin, Poplar Grove, IL (US)

(73) Assignee: GREENLEE TOOLS, INC, Rockford, IL (US)

(*) Notice: Subject to any disclaimer, the term of this patent is extended or adjusted under 35 U.S.C. 154(b) by 47 days.

(21) Appl. No.: 14/557,597

(22) Filed: Dec. 2, 2014

(65) Prior Publication Data

US 2015/0151349 A1 Jun. 4, 2015

Related U.S. Application Data

(60) Provisional application No. 61/910,733, filed on Dec. 2, 2013.

(51) Int. Cl.
| | | |
|---|---|---|
| *B21D 28/34* | (2006.01) | |
| *B23D 29/02* | (2006.01) | |
| *B26D 7/26* | (2006.01) | |
| *B26F 1/14* | (2006.01) | |
| *B26F 1/38* | (2006.01) | |

(52) U.S. Cl.
CPC ............ *B21D 28/343* (2013.01); *B23D 29/02* (2013.01); *B26D 7/26* (2013.01); *B26D 7/2614* (2013.01); *B26D 7/2621* (2013.01); *B26F 1/14* (2013.01); *B26F 1/386* (2013.01); *B26F 1/3846* (2013.01); *Y10T 83/9425* (2015.04); *Y10T 83/9428* (2015.04); *Y10T 83/9435* (2015.04); *Y10T 83/9476* (2015.04)

(58) Field of Classification Search
CPC ............ A61F 2005/4415; B21D 28/34; B21D 28/343; B21D 28/346; B23D 29/02;
(Continued)

(56) References Cited

U.S. PATENT DOCUMENTS

| 869,802 A | 10/1907 | Pearce |
|---|---|---|
| 2,221,904 A | 11/1940 | Abramson et al. |

(Continued)

FOREIGN PATENT DOCUMENTS

| EP | 0325442 A2 | 7/1989 |
|---|---|---|
| EP | 2208553 A2 | 7/2010 |
| JP | 2001-3917 | * 1/2001 |

OTHER PUBLICATIONS

European Search Report in connection with European Patent Application No. 14195307.5 dated Mar. 27, 2015, 5 pages.

*Primary Examiner* — Clark F Dexter
(74) *Attorney, Agent, or Firm* — Klintworth & Rozenblat IP LLP

(57) ABSTRACT

An assembly includes a punch and a clamping assembly. The punch includes a body having a front end and a rear end. The front end has a cutting edge. A passageway extends through the body and a counterbore is provided proximate to a second end of the body. The clamping assembly includes first and second jaws pivotally attached to each other. Each jaw includes a main body having a nose extending from a front surface thereof. The nose has an outer surface which has a diameter which is smaller than the outer diameter of the main body. When the clamping assembly is mated with the punch, the noses seat within the counterbore, and the front surfaces of the main bodies engage against the rear end of the body of the punch.

6 Claims, 9 Drawing Sheets

(58) Field of Classification Search
CPC .............. B26D 7/26; B26D 2007/2607; B26D 7/2614; B26D 7/2621; B26D 7/2628; B26D 7/2635; B26F 1/14; B26F 1/3846; B26F 1/386; B26F 1/3866; Y10T 83/9425; Y10T 83/9428; Y10T 83/9435; Y10T 83/9437; Y10T 83/9461; Y10T 83/9476
USPC .... 83/123, 613, 685, 686, 688–690, 698.31, 83/698.91; 30/360, 361, 366, 532, 533; 81/321, 177.7, 315; 16/422; 294/33; 29/410; 403/101, 102; 254/409
See application file for complete search history.

(56) References Cited

U.S. PATENT DOCUMENTS

| | | |
|---|---|---|
| 2,735,489 A | 2/1956 | Fowler |
| 3,014,277 A | 12/1961 | Geckler |
| 4,495,699 A | 1/1985 | Oakes |
| 4,594,779 A | 6/1986 | Hagemeyer |
| 4,821,417 A | 4/1989 | Levine |
| 4,869,511 A * | 9/1989 | Spoonster, Sr. ... A63B 69/3638 473/203 |
| 4,895,471 A * | 1/1990 | Geltz et al. ............... F16B 7/14 211/105.3 |
| 5,016,352 A * | 5/1991 | Metcalf ................ B26B 21/225 30/47 |
| 5,791,053 A | 8/1998 | Koong |
| 5,890,223 A | 4/1999 | Klemmer |
| 6,115,921 A | 9/2000 | Garneau, Sr. |
| 6,421,921 B1 | 7/2002 | Garneau, Sr. |
| 6,981,327 B2 | 1/2006 | Nordlin |
| 2002/0092181 A1 | 7/2002 | Choi |
| 2003/0061716 A1* | 4/2003 | Chen ................... A01G 3/0255 30/296.1 |
| 2006/0175228 A1 | 8/2006 | Howel et al. |
| 2007/0207007 A1* | 9/2007 | Orange et al. .......... F16B 39/36 411/270 |
| 2009/0019709 A1 | 1/2009 | Fisher et al. |
| 2010/0180744 A1 | 7/2010 | Nordlin |
| 2011/0277610 A1 | 11/2011 | Nordlin et al. |

\* cited by examiner

CUTTING ASSEMBLY INCLUDING CLAMPING ASSEMBLY

This application claims the domestic priority of U.S. Provisional application Ser. No. 61/910,733, filed on Dec. 2, 2013, the disclosure of which is incorporated by reference herein in its entirety.

FIELD OF THE INVENTION

The invention relates to a clamping assembly for use with a knockout punch.

BACKGROUND OF THE DISCLOSURE

Knockout punches are used routinely to create holes in thin layers of material such as the sheet metal found on electrical boxes. Knockout punches are used in conjunction with a draw stud, a ram, and a die which are all used to punch a hole.

The user drills a pilot hole approximately in the center of the area where the final hole needs to be located. The draw stud, which has been attached to the ram, has the die slid over its free end until the die abuts the ram. The draw stud is then inserted with its free end first through the pilot hole until the die is seated against one side of a sheet of material. The knockout punch, which has a central hole with internal threads, is screwed onto the free end of the draw stud which has complementary-shaped external threads on it. This process continues until the knockout punch impinges onto the side of the sheet of material opposite the side on which the die is located. As a result, the sheet of material is snugly captured on both sides by the die and punch. Finally, the ram is actuated such that the draw stud and knockout punch are drawn toward the ram, supplying sufficient force to the knockout punch to puncture and cut the sheet of material and produce the final hole.

The ram that is used is usually mechanically or hydraulically powered, but can be powered by other means. Overall, this device works well, however, the most time consuming task is screwing the knockout punch onto the draw stud, which can take as long as thirty to sixty seconds to accomplish depending on the length of the draw stud. Of course, this can be frustrating and inefficient for the user, especially when a great number of holes need to be punched. Accordingly, there has been a need to find a way to couple the knockout punch to the draw stud in a faster manner.

SUMMARY

An assembly in accordance with some example embodiments includes a punch and a clamping assembly. The punch includes a body having a front end and a rear end. The front end has a cutting edge. A passageway extends through the body and a counterbore is provided proximate to a second end of the body. The clamping assembly includes first and second jaws pivotally attached to each other. Each jaw includes a main body having a nose extending from a front surface thereof. The nose has an outer surface which has a diameter which is smaller than the outer diameter of the main body. When the clamping assembly is mated with the punch, the noses seat within the counterbore, and the front surfaces of the main bodies engage against the rear end of the body of the punch.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION OF THE ILLUSTRATED EMBODIMENT

Figure 1:
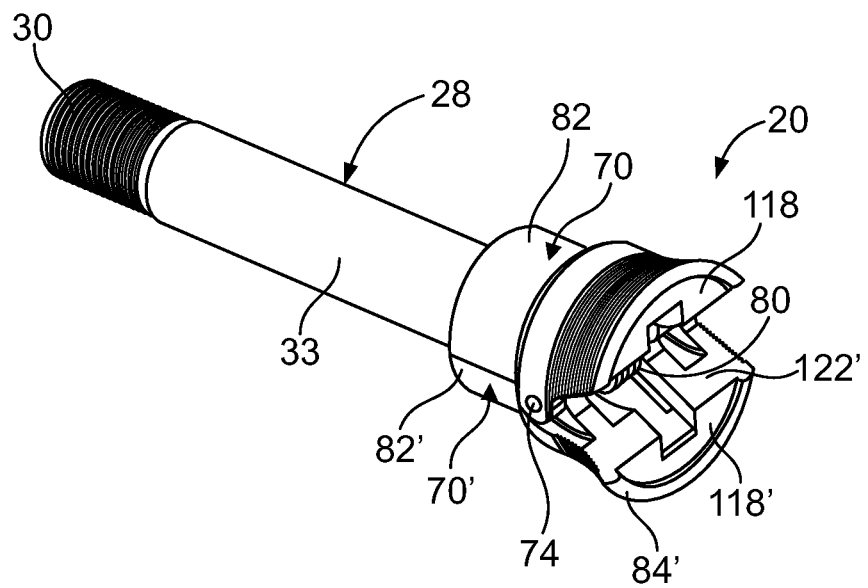
FIG. 1 is a perspective view of a clamping assembly which incorporates the features of some example embodiments and is mounted on a draw stud.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative embodiments within the scope of the disclosure.

A clamping assembly 20 for driving a knockout punch assembly 22 is provided. The knockout punch assembly 22 includes a die 24 and a punch 26. The clamping assembly 20 is attached to a draw stud 28 to quickly and easily secure the punch 26 onto the draw stud 28.

Figure 3:
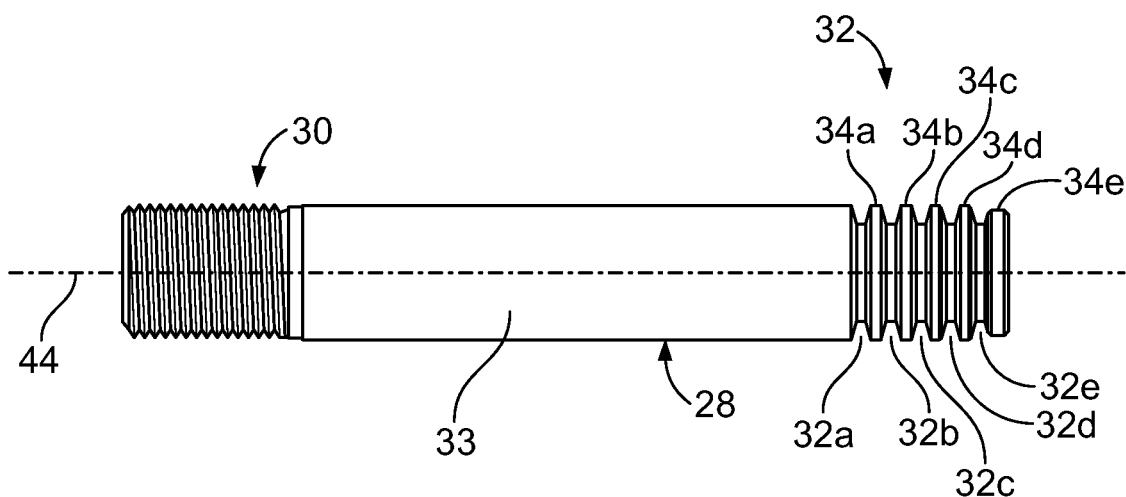
FIG. 3 is a side elevation view of the draw stud.
Figure 4:
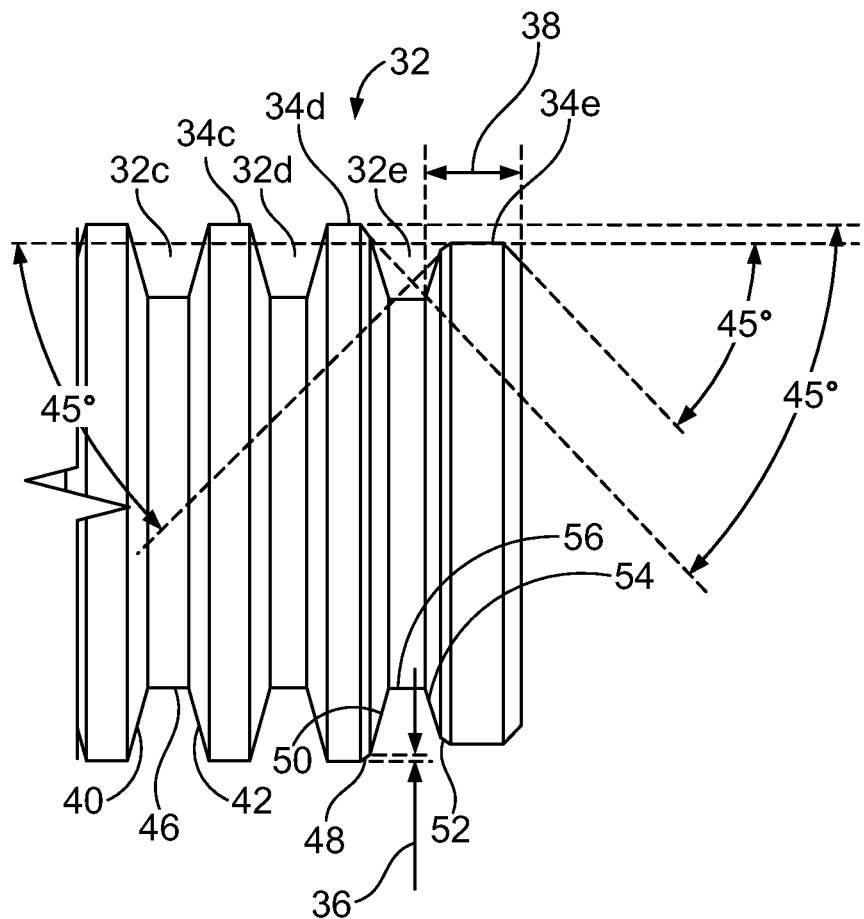
FIG. 4 is an enlarged side elevation view of an end portion of the draw stud.
Figure 6:
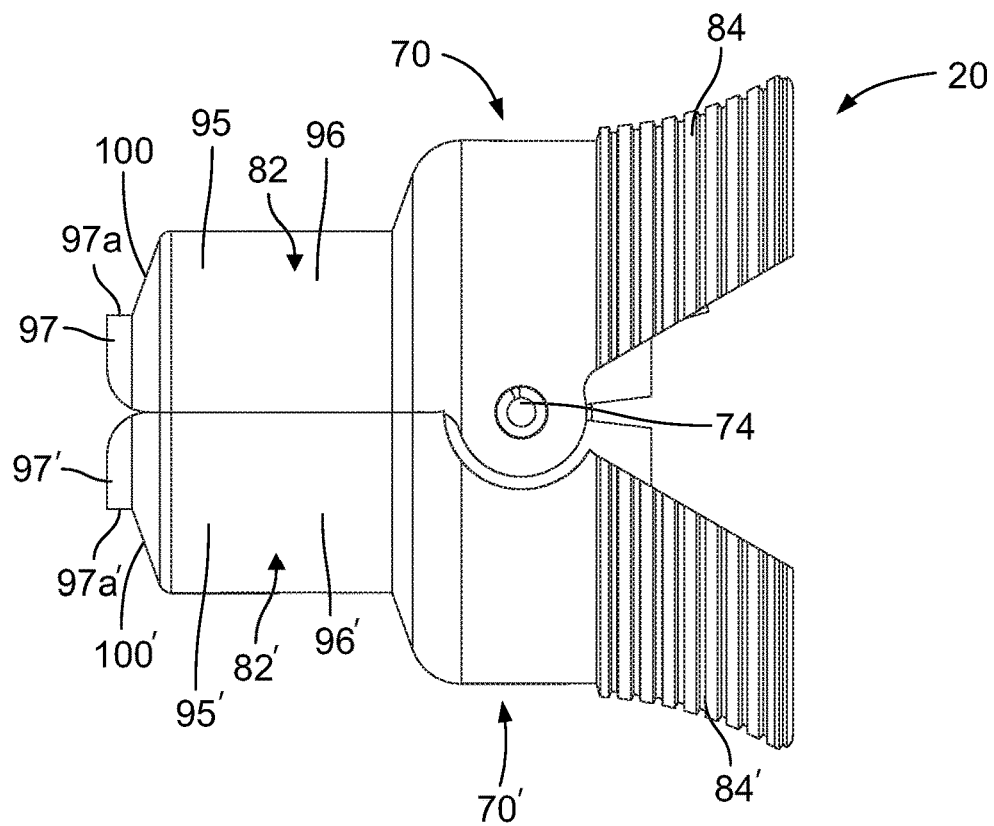
FIG. 6 is a side elevation view of the clamping assembly.

The draw stud 28 is an elongated cylinder having attachment structure provided on each end, with a central portion 33 which does not have an attachment structure provided thereon. The attachment structure may take the form of conventional threads on each end, however, as shown in FIG. 3, the attachment structure takes the form of a conventional thread form 30 (such as a helix) formed on one end thereon and a grooved end 32 formed from a plurality of alternating annular grooves 32a, 32b, 32c, 32d, 32e and annular lands 34a, 34b, 34c, 34d, 34e formed on the other end thereof. The portion 33 of the draw stud 28 between the threaded end 30 and the grooved end 32 is unthreaded.

The grooves 32a, 32b, 32c, 32d, 32e are separated from each other by the lands 34a, 34b, 34c, 34d. The lands 34a, 34b, 34c, 34d have the same outer diameter as the unthreaded portion 33 of the draw stud 28. The land 34e at the end of the draw stud 28 which is rearward of the rearwardmost groove 32e has a reduced diameter (shown as dimension 36) relative to the lands 34a, 34b, 34c, 34d forwardly thereof and the unthreaded portion 33 of the draw stud 28 for reasons described herein. In addition, land 34e has a length which is greater (shown as dimension 38) than lands 34a, 34b, 34c, 34d for reasons described herein. Each groove 32a, 32b, 32c, 32d has forward and rearward sections 40, 42 which taper from the respective adjacent lands (for example between land 34a and land 34b) at an angle relative to a centerline 44 of the draw stud 28, and a middle section 46 which is parallel to the centerline 44 of the draw stud 28. Each middle section 46 has the same diameter. Groove 32e has a first forward section 48 which tapers from land 34d at an angle, for example 45°, relative to the centerline 44 of the draw stud 28, a second forward section 50 which tapers from first forward section 48 at an angle relative to the centerline 44 of the draw stud 28, a first rearward section 52 which tapers from land 34e at an angle, for example 45°, relative to the centerline 44 of the draw stud 28, a second rearward section 54 which tapers from first rearward section 52 at an angle relative to the centerline 44 of the draw stud 28, and a middle section 56 which is parallel to the centerline 44 of the draw stud 28. The middle section 56 has the same diameter as middle sections 46.

Figure 2:
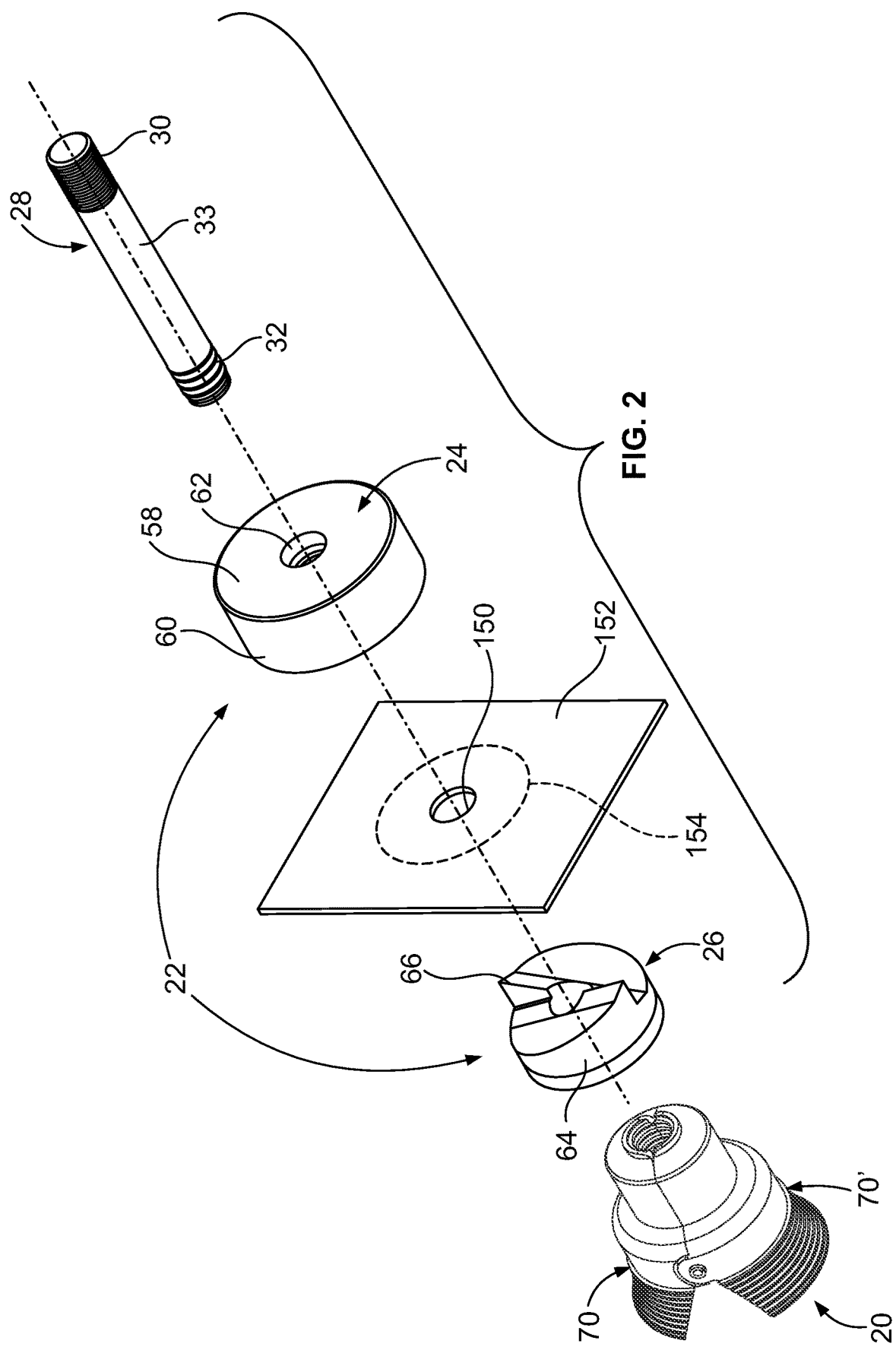
FIG. 2 is a perspective view of the clamping assembly, the draw stud, a workpiece, a die and a punch, shown exploded from each other.

As shown in FIG. 2, the die 24 is conventionally formed and includes a base wall 58 and a circular side wall 60 extending from the outer perimeter of the base wall 58. A recess (not shown) is provided by the inner surface of the side wall 60 and the base wall 58, and the recess is in communication with a central passageway 62 extending through the base wall 58. The central passageway 62 has a diameter which is slightly greater than the diameter of the unthreaded portion 33 of the draw stud 28.

Figure 5:
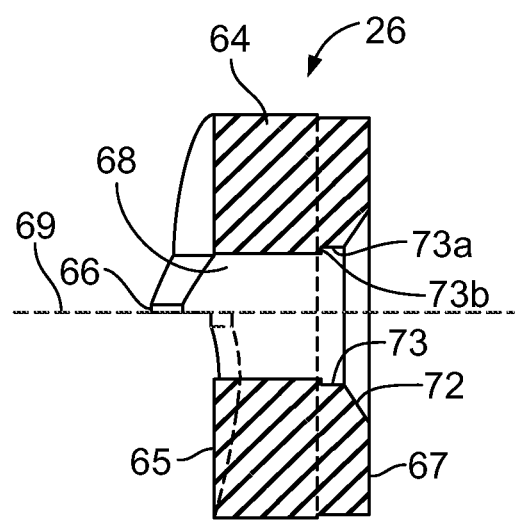
FIG. 5 is a cross-sectional view of the punch.

As best shown in FIG. 5, the punch 26 includes a body having a circular wall 64 having a front end 65 and a rear end 67. The front end 65 has a cutting/punching edge 66 provided thereon as is known in the art. A central passageway 68 is provided through the center of the wall 64 and has a diameter which is slightly greater than the diameter of the unthreaded portion 33 of the draw stud 28. A centerline 69 is defined through the central passageway 68. A rear end of the central passageway 68 has a chamfer 72 extending from the rear end 67 of the wall and a counterbore 73 extending inwardly from the chamfer 72. The counterbore 73 has a circular side wall 73a which is parallel to the centerline 69 and an end wall 73b which is perpendicular to the centerline 69.

Figure 16:
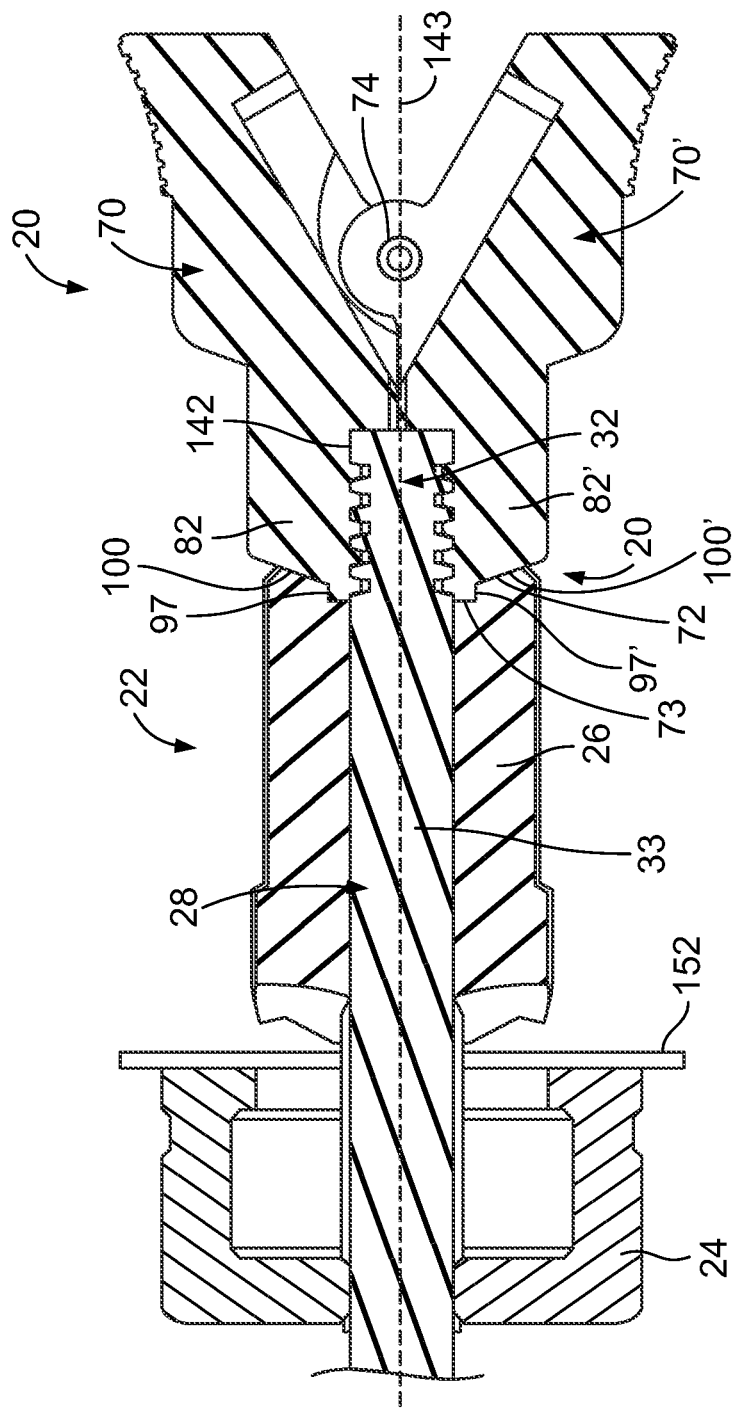
FIG. 16 is a partial cross-sectional view of the clamping assembly, the draw stud, the punch and the die.

As shown in FIGS. 6-14, the clamping assembly 20 includes a pair of jaws 70, 70', a pair of cylindrical roll pins 74 engaged with the jaws 70, 70', and a torsion spring 80 mounted on the pins 74 and between the jaws 70, 70'. When joined together, the jaws 70, 70' form a socket 142 as described herein. The socket 142 defines a centerline 143 (see FIG. 16) of the assembled jaws 70, 70'. The clamping assembly 20 is attached to the grooved end 32 of the draw stud 28 as described herein to quickly and easily secure the punch 26 onto the draw stud 28. The jaws 70, 70' of the clamping assembly 20 are identically formed. Therefore, only one jaw 70 is described and the other jaw 70' is shown with like reference numerals, but having a prime with the reference number.

The jaw 70 is formed from a body 82, a grip 84 extending from the body 82, and ears 86, 88, 90 which extend downwardly from the grip 84.

The body 82 is defined by a main portion 95 having a projecting locking nose 97 at a front end 92 thereof. The main portion 95 has a front tapered surface 100 which extends upwardly and outwardly from the locking nose 97, an outer surface 96 extending between the tapered surface 100 and a rear end 94 of the main portion 95, and an inner surface 98 extending between the front end 92 and the rear end 94. The outer surface 96 is arcuate. The inner surface 98 has first and second sections 102, 104 and a central arcuate section 106 extending between the first and second sections 102, 104. The first and second sections 102, 104 are planar with each other.

Figure 7:
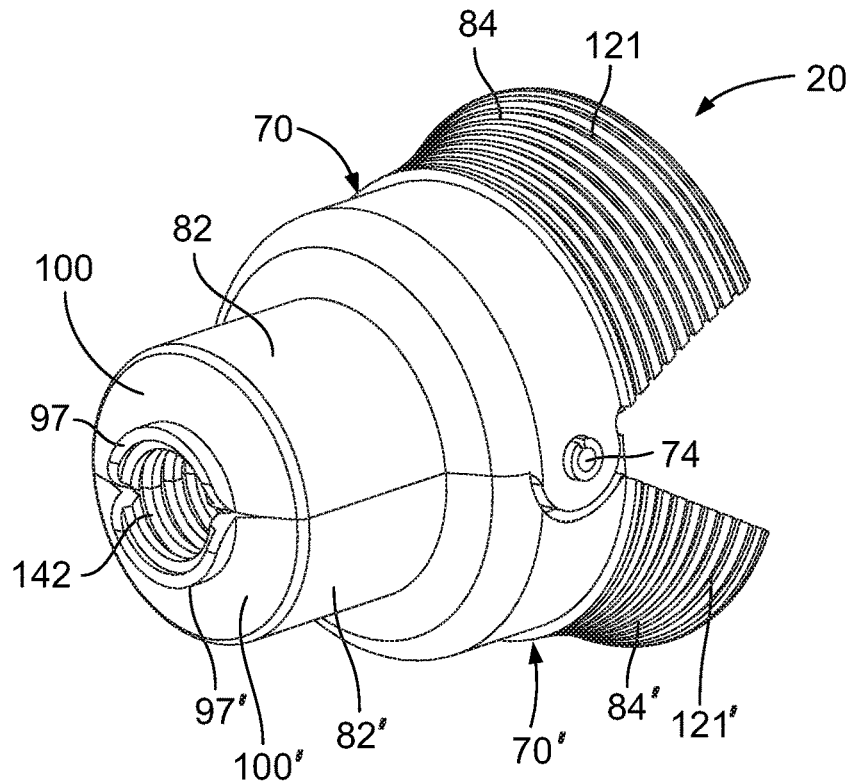
FIG. 7 is a perspective view of the clamping assembly.
Figure 8:
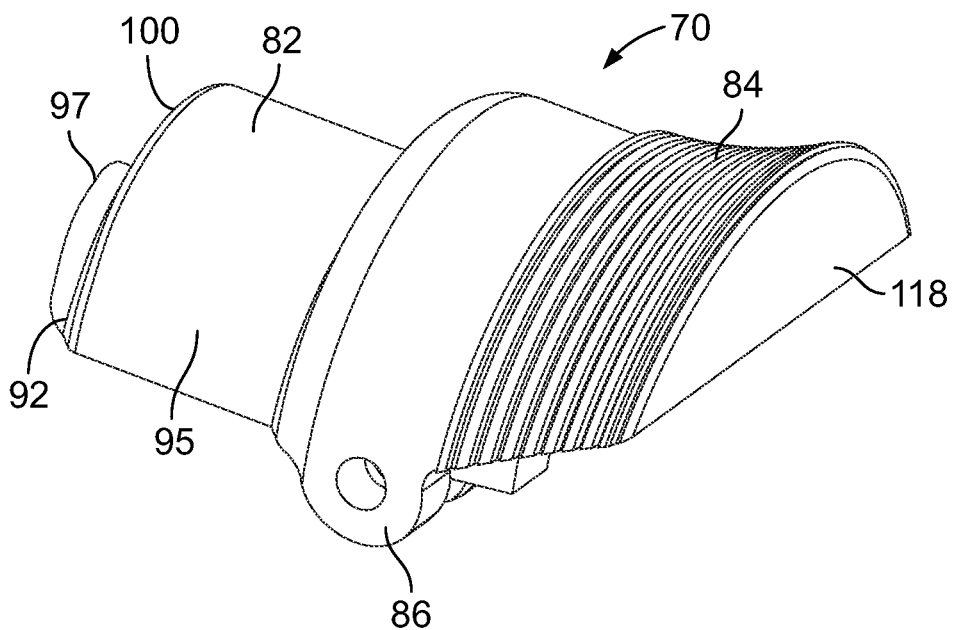
FIG. 8 is a perspective view of one of the jaws of the clamping assembly.
Figure 9:
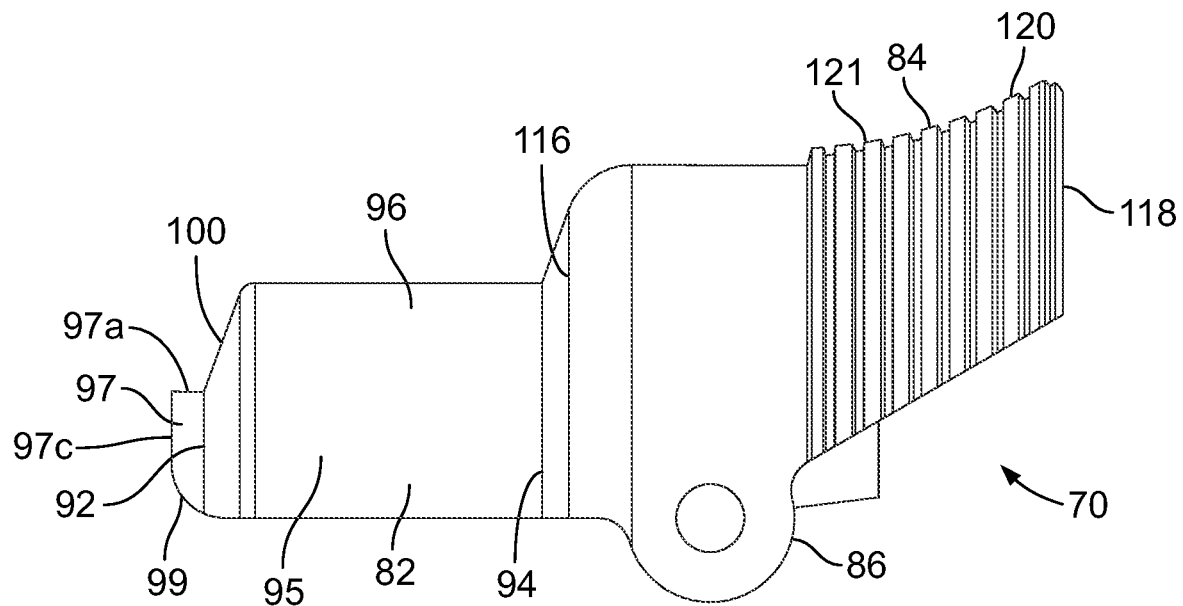
FIG. 9 is a side elevation view of the jaw of FIG. 8.
Figure 10:
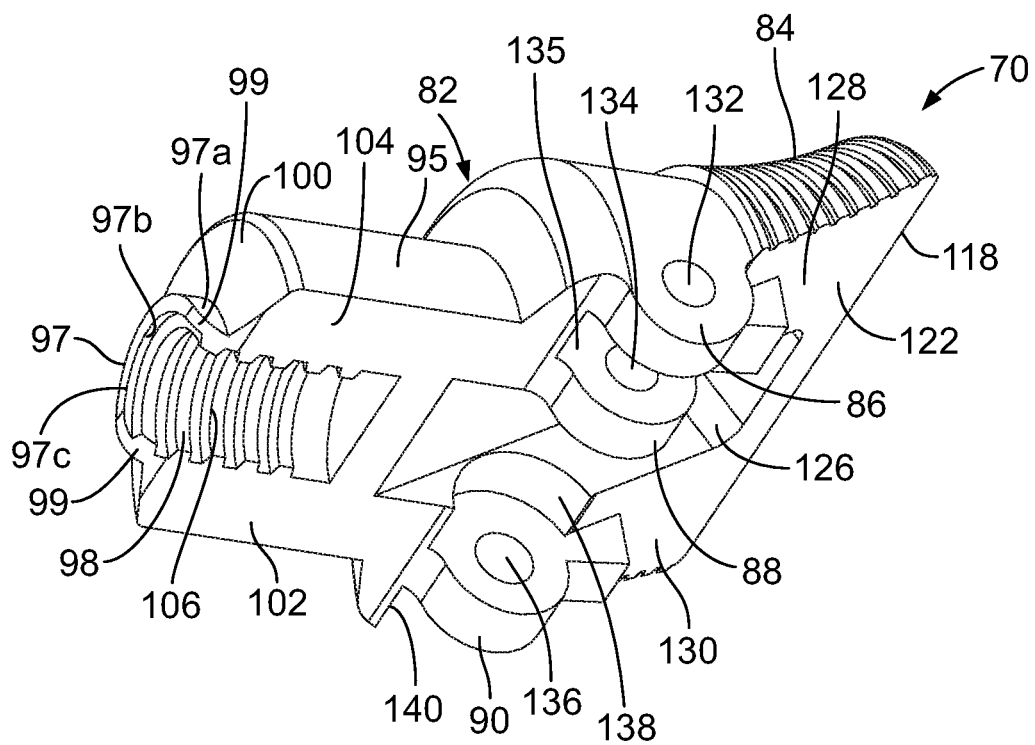
FIG. 10 is a perspective view of the jaw of FIG. 8.
Figure 11:
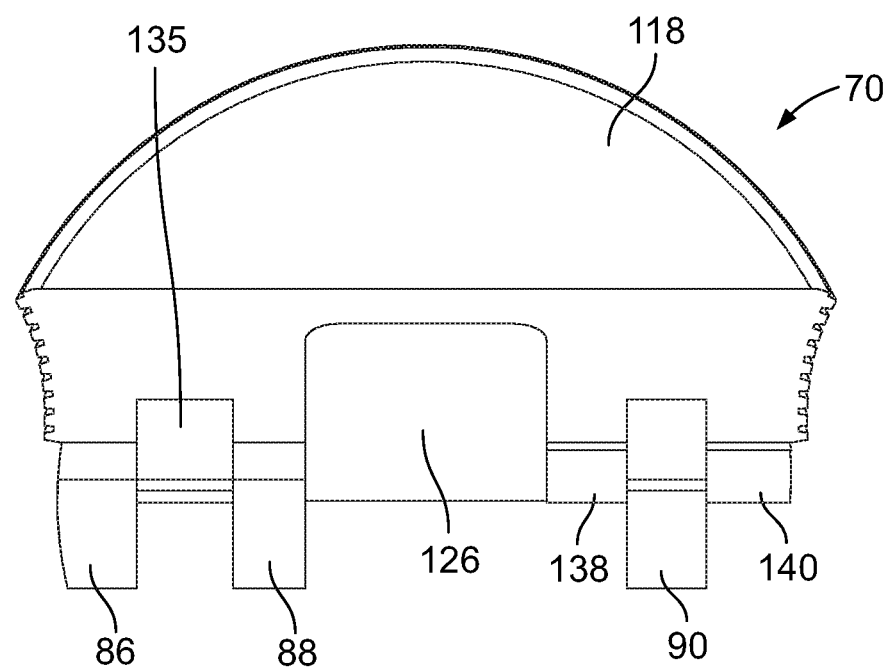
FIG. 11 is rear elevation view of the jaw of FIG. 8.

As best shown in FIGS. 7 and 10, the locking nose 97 is semi-annular such that the nose 97 forms half of a circle, and has outer and inner surfaces 97a, 97b extending outwardly from the tapered surface 100 and an end surface 97c extending between the outer and inner surfaces 97a, 97b. The ends 99 of the end surface 97c can be curved.

Figure 12:
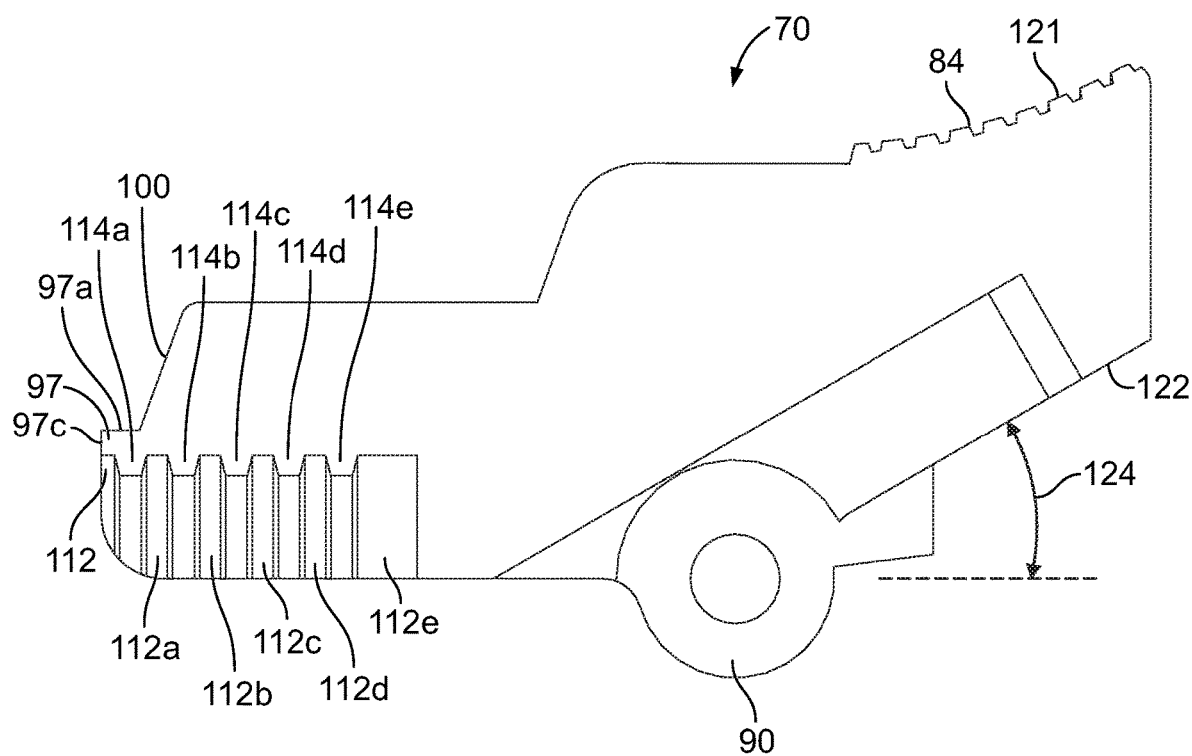
FIG. 12 is a cross-sectional view of the jaw of FIG. 8.
Figure 13:
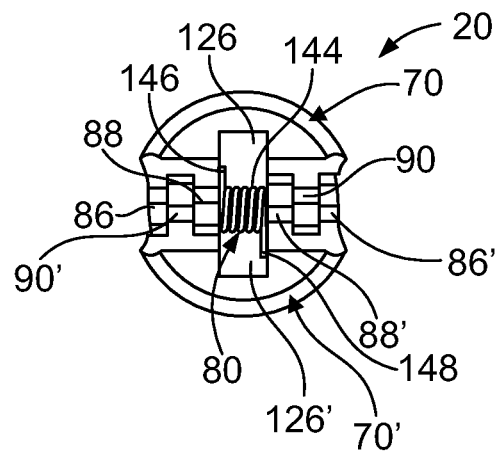
FIG. 13 is an end elevation view of the clamping assembly.
Figure 14:
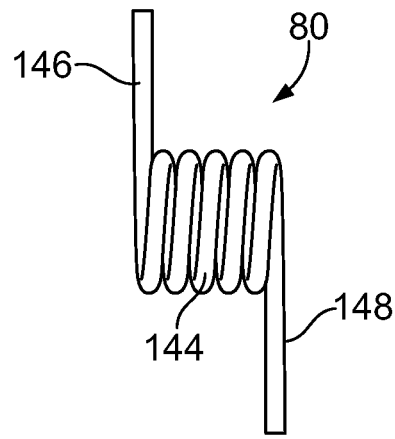
FIG. 14 is a side elevation view of a spring which forms part of the clamping assembly.
Figure 15:
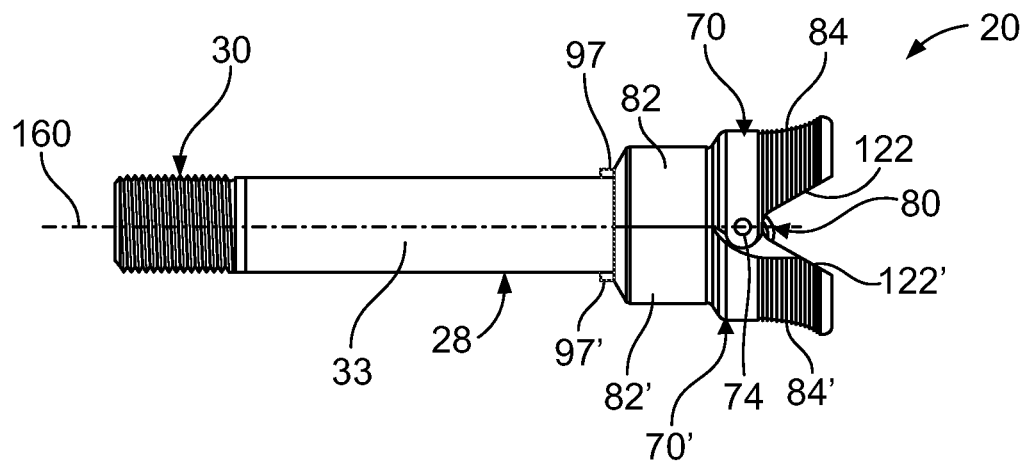
FIG. 15 is a side elevation view of the clamping assembly and the draw stud.

As best shown in FIG. 12, the inner surface 97b of the locking nose 97 and the central arcuate section 106 of the main portion 95 have attachment structure for attaching the jaw 70 to the draw stud 28. As shown, the attachment structure may take the form of a plurality of alternating grooves 112, 112a, 112b, 112c, 112d, 112e and lands 114a, 114b, 114c, 114d, 114e provided thereon. Land 114a on the jaw 70 complements the shape of groove 32a on the draw stud 28; land 114b on the jaw 70 complements the shape of groove 32b on the draw stud 28; land 114c on the jaw 70 complements the shape of groove 32c on the draw stud 28; land 114d on the jaw 70 complements the shape of groove 32d on the draw stud 28; and land 114e on the jaw 70 complements the shape of groove 32e on the draw stud 28. Groove 112 on the jaw 70 complements the shape of the end of the unthreaded portion 33 on the draw stud 28; groove 112a on the jaw 70 complements the shape of land 34a on the draw stud 28; groove 112b on the jaw 70 complements the shape of land 34b on the draw stud 28; groove 112c on the jaw 70 complements the shape of land 34c on the draw stud 28; groove 112d on the jaw 70 complements the shape of land 34d on the draw stud 28; groove 112e on the jaw 70 generally complements the shape of land 34e on the draw stud 28. Groove 112e is larger than land 34e such that a space is provided between the groove 112e and the land 34e.

The grip 84 is defined by a front end 116 which extends from the rear end 94 of the body 82, a rear surface 118 which is parallel to the front end 92 of the body 82, an outer surface 120 extending between the front end 116 and the rear surface 118, and an inner surface 122 extending between the front end 116 and the rear surface 118. The outer surface 120 is arcuate and preferably has a plurality of ridges 121 provided thereon to enable a user to easily grip the grip 84. The inner surface 122 is angled (shown at dimension 124) relative to the plane in which the first and second sections 102, 104 of the body 82 are provided, preferably at an angle of 30°. At the midpoint of the inner surface 122, a slot 126 is provided. As a result, a first section 128 of the inner surface 122 is defined on one side of the slot 126, and a second section 130 of the inner surface 122 is defined on the other side of the slot 126.

Ears 86 and 88 extend downwardly from the first section 128 and are spaced apart from each other. Ear 90 extends downwardly from the second section 130. The ears 86, 88, 90 extend downwardly from the body 82 and the grip 84. Each ear 86, 88, 90 has an arcuate outer surface and an aperture 132, 134, 136 which extends therethrough. The apertures 132, 134, 136 are aligned with each other. Predetermined ones of the apertures can be larger than the remaining apertures. The area 135 of the inner surface 122 between the pair of spaced apart ears 86, 88 is curved to conform to the shape of the ear 90' on the other jaw 70'. The areas 138, 140 of the inner surface 122 on either side of ear 90 are curved to conform to the shape of the pair of spaced apart ears 86', 88' on the other jaw 70'.

The jaws 70, 70' are meshed together such that the first and second sections 102, 104 of the body 82 of jaw 70 seat against the first and second sections of the body 82' of jaw 70', and the inner surfaces 122, 122' of the grips 84, 84' face each other. A centerline 160 is formed between the mated jaws 70, 70'. Ear 90 on jaw 70 seats between ears 86', 88' on jaw 70' and abuts against the curved area (identical to area 135) on jaw 70, and ear 90' on jaw 70' seats between ears 86, 88 on jaw 70 and abuts against the curved area 135 on jaw 70. The apertures 132, 134, 136 provided through ears 86, 88 and 90 and those provided through ears 86', 88' and 90' align with each other. The slots 126, 126' align with each other. When the jaws 70, 70' are meshed, the socket 142 is provided between the bodies 82, 82' into which the annular grooves 32*a*, 32*b*, 32*c*, 32*d* and lands 34*a*, 34*b*, 34*c*, 34*d* are seated as discussed herein.

When the jaws 70, 70' are joined together as described herein and the jaws 70, 70' are in a closed position, the locking noses 97, 97' generally form a circle as shown in FIG. 7. As clearly shown in FIG. 6, when the jaws 70, 70' are in a closed position, the outer surfaces 97*a*, 97*a*' of the locking noses 97, 97' define an outer diameter which is less than an outer diameter defined by the outer surfaces 96, 96' of the main, portions 95, 95'. The outer surfaces 97*a*, 97*a*' of the locking noses 97, 97' are at an angle relative to the front surfaces 100, 100' of the main portions 95, 95'. The outer surfaces 97*a*, 97*a*' of the noses 97, 97' may be parallel to the centerline 143 around the diameter of the noses 97, 97'.

As stated earlier, lands 114*a* complement the shape of groove 32*a*, lands 114*b* complement the shape of groove 32*b*, lands 114*c* complement the shape of groove 32*c*, lands 114*d* complement the shape of groove 32*d*, and lands 114*e* complement the shape of groove 32*e*; and grooves 112 complement the shape of the end of the unthreaded portion 33 on the draw stud 28, grooves 112*a* complement the shape of land 34*a*, grooves 112*c* complement the shape of land 34*c*, grooves 112*d* complement the shape of land 34*d*, and grooves 112*e* generally complement the shape of land 34*e*. The lands 114*a*, 114*b*, 114*c*, 114*d*, 114*e* on each jaw 70, 70' fall along the same radius from the centerline 160. Each groove 112, 112*a*, 112*b*, 112*c*, 112*d*, 112*e* has forward and rearward sections which taper from the respective adjacent lands (for example between land 114*a* and land 114*b*) at an angle relative to the centerline 160, and a middle section which is parallel to the centerline 160. The middle section of each groove 112, 112*a*, 112*b*, 112*c*, 112*d*, 112*e* on each jaw 70, 70' falls along the same radius from the centerline 160. In addition, groove 112*e* has a length which is greater than grooves 112, 112*a*, 112*b*, 112*c*, 112*d*.

The torsion spring 80 has a central coiled section 144, a first straight section 146 extending from one end of the coiled section 144 and a second straight section 148 extending from the opposite end of the coiled section 144. The central coiled section 144 seats between the ears 88, 88' when the jaws 70, 70' are meshed together. The first straight section 146 seats within the slot 126 in jaw 70, and the second straight section 148 seats within the slot 126' in jaw 70'.

The jaws 70, 70' are mated together such that the ears 86, 90', 88 intermesh. Pin 74 is mounted so that it extends through ears 86, 90', 88 and extends into the central coiled section 144 of the torsion spring 80. A first pin 74 is inserted first into the aperture in ear 86 and is hammered into place until it is flush with the outer surface of ear 86. A second pin 74 is mounted so that it extends through ears 86', 90, 88' and extends into the central coiled section 144 of the torsion spring 80. The second pin 74 is inserted first into the aperture in ear 86' and is hammered into place until it is flush with the outer surface of ear 86'. Alternatively, a single pin can be used. The jaws 70, 70' can pivot around the pins 74 as described herein. The inner surfaces 98, 98' and the inner surfaces of the locking noses 97, 97' form a bore into which the draw stud 28 is inserted.

In its normal condition, the torsion spring 80 biases the jaws 70, 70' into a closed position, wherein the bodies 82, 82' press against each other. The jaws 70, 70' can be moved to an open position by a user pressing on the outer surfaces 120 of the grips 84, 84'. When the grips 84, 84' are pressed, the force of the torsion spring 80 is overcome such that the inner surfaces 122, 122' of the grips 84, 84' move toward each other, and thus, the bodies 82, 82' move away from each other.

Once assembled, the clamping assembly 20 can be used with the draw stud 28 in the following way. First, the user drills a pilot hole 150 in a workpiece 152. The threaded end 30 of the draw stud 28 is threaded into an associated ram (not shown). The grooved end 32 of the draw stud 28 is passed through the die 24, then through the pilot hole 150 to prepare for punching a hole. Next, the punch 26 is slid over the grooved end 32 until the punch 26 is positioned over the unthreaded portion 33. The cutting/punching edge 66 of the punch 26 faces the workpiece 152 and the counterbore 73 is proximate to the grooved end 32. The clamping assembly 20 is then moved to its open position and the grooved end 32 of the draw stud 28 is inserted into the socket 142. The locking noses 97, 97' of the bodies 82, 82' are inserted into the counterbore 73 of the punch 26, and the chamfer 72 of the punch 26 engages against the tapered surfaces 100, 100' of the jaws 70, 70'. The outer surfaces 97*a*, 97*a*' of the locking nose 97, 97' are proximate to the side wall 73*a*, and the end surfaces 97*c*, 97*c*' are proximate to the end wall 73*b*. The counterbore 73 is larger than the outer diameter of the locking noses 97, 97' so that the locking noses 97, 97' can be inserted therein when the jaws 70, 70' are in a slightly open position. The pressure against the grips 84, 84' is then removed which causes the torsion spring 80 to return to its natural position and close the clamping assembly 20 onto the grooved end 32. Groove 112 engages with the end of the unthreaded portion 33. The attachment structure in the noses 97, 97' may be eliminated such that the noses 97, 97' do not attach to the draw stud 28. The grooves 112*a*, 112*b*, 112*c*, 112*d*, 112*e* and lands 114*a*, 114*b*, 114*c*, 114*d*, 114*e* on the clamping assembly 20 intermesh with the annular grooves 32*a*, 32*b*, 32*c*, 32*d*, 32*e* and lands 34*a*, 34*b*, 34*c*, 34*d*, 34*e* on the draw stud 28 to securely attach the clamping assembly 20 to the draw stud 28. Since the land 34e has a length which is greater than the remaining lands 34a, 34b, 34c, 34c, the draw stud 28 cannot be inserted improperly since the lands 34a, 34b, 34c, 34d, 34e on the draw stud 28 must match into the corresponding grooves 112a, 112b, 112c, 112d, 112e in the clamping assembly 20 in order for the clamping assembly 20 to close. This ensures full engagement of the jaws 70, 70' with the draw stud 28 throughout the punching cycle. Finally, the user actuates the ram which causes the draw stud 28, the clamping assembly 20 and the knockout punch 26 to move relative to the die 24 causing the knockout punch assembly 22 to engage the workpiece 152 and create a hole 154. The grooves 112a, 112b, 112c, 112d, 112e and lands 114a, 114b, 114c, 114d, 114e on the jaws 70, 70' and the annular grooves 32a, 32b, 32c, 32d, 32e and lands 34a, 34b, 34c, 34d, 32e on the draw stud 28 distribute the load, which permits punching forces as high as 12,000 pounds.

Once the hole 154 has been created, the user can easily and quickly disengage the clamping assembly 20 from the punch 26 and the draw stud 28. The punch 26 is moved axially along the draw stud 28 to release the locking noses 97, 97' from within the counterbore 73. Next, the clamping assembly 20 is moved to its open position by pressing on the grips 84, 84' and removed from the draw stud 28. The punch 26 is then removed from the draw stud 28, the draw stud 28 is removed from the workpiece 152, and the draw stud 28 is removed from the ram and the die 24. Since land 34e has a smaller outer diameter than the remaining lands 34a, 34b, 34c, 34d this provides for a relief which overcomes the interference that would otherwise be encountered when the jaws 70, 70' are rotated to the open position when the clamping assembly 20 is removed from the draw stud 28.

The engagement of the locking noses 97, 97' into the counterbore 73 aids in preventing the clamping assembly 20 from "bouncing" off of the draw stud 28 when the punching cycle finishes and tension on the draw stud 28 suddenly drops. The engagement of the locking noses 97, 97' in the counterbore 73 absorbs the energy released at the completion of the punching cycle without allowing the clamping assembly 20 to bounce off of the draw stud 28. When the punching cycle is completed, there is a sudden release of energy as the tension in the draw stud 28 falls to zero. The engagement of the locking noses 97, 97' with the punch 26 keeps the clamping assembly 20 from "bouncing" off the draw stud 28 because the punch 26 must move away from the clamping assembly 20 before the clamping assembly 20 can open.

A variety of punch/die sizes can be used with the clamping assembly 20. The axial length of the punches complements the depth of the dies such that a single draw stud length works with all punch/die combinations. This minimizes the part count (one draw stud) and avoids the need for spacers. By optimizing the length of the draw stud for all punch/die combinations, the punching time is also minimized.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed:

1. An assembly comprising:
a punch including a body having a front end and a rear end, the front end having a cutting edge thereon which is configured to cut an associated workpiece, a passageway having a predetermined diameter extending through the body from the front end toward the rear end for receiving a draw stud therethrough, and a counterbore having a predetermined diameter which is larger than the diameter of the passageway and extending from a rear end of the passageway toward the rear end of the body; and
first and second jaws pivotally attached to each other around a pivot, wherein the jaws are in a closed position and engaged with the punch, wherein the jaws are configured to be pivoted around the pivot to the closed position and engaged with the punch, and configured to be pivoted around the pivot to an open position for opening when not engaged with the punch, each jaw comprising a main body and a locking nose extending from the main body, wherein for each jaw:
the main body having an outer surface, an opposite inner surface, a front surface extending to the locking nose, and a rear end between the outer and inner surfaces,
the locking nose having an outer surface, an inner surface and a front surface extending between the outer and inner surfaces of the locking nose, and
the inner surface of the locking nose and the inner surface of the main body both having meshing attachment structure formed thereon that together form a jaw meshing attachment structure for intermeshing with meshing attachment structure on the draw stud in the closed position of the jaws,
the outer surfaces of the main bodies together defining an outer diameter, and the outer surfaces of the locking noses together defining an outer diameter, the outer diameter defined by the locking noses is smaller than the outer diameter defined by the main bodies; and
a spring provided between the first and second jaws, wherein the spring biases the jaws into the closed position, and wherein, in the closed position, the engagement of the jaws with the punch includes the locking noses seated within the counterbore of the punch and the front surfaces of the main bodies engaged against the rear end of the body of the punch age.

2. The assembly of claim 1, wherein the outer surface of each main body has a gripping surface provided thereon.

3. The assembly of claim 1, wherein the front surface of each main body is tapered, and the rear end of the punch includes a chamfer extending from a rear end of the counterbore to the rear end of the body and which engages with the tapered front surfaces in the closed position.

4. The assembly of claim 1, wherein the jaw meshing attachment structure comprises a plurality of alternating grooves and lands formed on said locking noses and said main bodies, and further comprising a draw stud extending through the passageway of the punch, said draw stud having meshing attachment structure comprising a plurality of alternating grooves and lands formed on an exterior surface thereof, said alternating grooves and lands on said locking noses and said main bodies intermeshing with said alternating grooves and lands on the draw stud.

5. The assembly of claim 4, wherein said grooves and lands formed on said draw stud are annular, said alternating grooves and lands formed on said locking noses and main bodies are semi-annular.

6. The assembly of claim 1, further comprising a die movably mounted on said draw stud.

\* \* \* \* \*

UNITED STATES PATENT AND TRADEMARK OFFICE
CERTIFICATE OF CORRECTION

PATENT NO. : 10,835,944 B2  
APPLICATION NO. : 14/557597  
DATED : November 17, 2020  
INVENTOR(S) : William Frederick Nordlin It is certified that error appears in the above-identified patent and that said Letters Patent is hereby corrected as shown below:

In the Claims

Claim 1, in Column 8, Line 52:
Delete "the punch age." and insert -- the punch. --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*